Patented Apr. 3, 1945

2,373,067

UNITED STATES PATENT OFFICE 2,373,067

POLYMERS OF UNSATURATED ACID COMPOUND AND ALPHA OLEFINIC COMPOUND

Robert M. Thomas, Union, and William J. Sparks, Cranford, N. J., assignors to Standard Oil Development Company, a corporation of Delaware No Drawing. Application October 18, 1940, Serial No. 361,723

6 Claims. (Cl. 260—78)

This invention relates to high molecular weight polymeric substances of resinous character; relates particularly to interpolymers or copolymers of unsaturated acid anhydrides and their esters or half esters with alpha olefins of the isobutenyl type; and relates especially to the interpolymerization of maleic anhydride and its homologs with alpha olefinc compounds such as dimethallyl ether and its homologs.

The present invention is a polymerization process, and a high molecular weight polymer produced thereby in which an unsaturated acid or its anhydride ester or half ester, is polymerized with an alpha olefin or a substantially neutral derivative thereof of the isobutenyl type such as dimethallyl ether or its homologs to produce a high molecular resinous polymer without the elimination of any portion of any of the reacting molecules by a reaction which appears to involve the elimination of double-bonds in the respective compounds, this reaction being thereby sharply distinguished from substitution reactions by which substituted acids or substituted acid anhydrides are produced. The polymerization reaction is preferably conducted at an elevated temperature, with the aid of a polymerization catalyst of the peroxide type such as benzoyl peroxide; under elevated pressure if the reactants have boiling points at atmospheric pressure below polymerization temperature.

Thus the invention polymerizes mixtures of unsaturated acids, anhydrides, esters or half esters with alpha olefinic compounds at elevated temperatures in the presence of polymerization catalysts to produce a high molecular weight oxygenated polymer or resin.

Broadly, the invention is applicable to maleic anhydride and its homologs, together with their acids, esters and half esters in reaction with the alpha olefins of the isobutenyl type.

Other objects and details of the invention will be apparent from the following description.

In practicing the invention, the desired proportion of the unsaturated acidic compound is mixed with the desired proportion of the alpha olefin; a small proportion of a catalyst is added which may conveniently be an organic peroxide; and the mixture is heated to a temperature of approximately 70° to 150° C. whereupon a strongly exothermic reaction occurs to produce the desired high molecular weight polymer.

Example 1

98 grams of maleic anhydride were dissolved in 125 grams of dimethallyl ether, a fraction of a gram of benzoyl peroxide was added, and the mixture heated with stirring. When a temperature of approximately 130° C. was reached, a vigorous, exothermic reaction occurred. This reaction resulted in an almost quantitative yield of a hard white synthetic resin which was found to be insoluble in any of the ordinary solvents, and which was resistant to temperatures as high as 250° C.

A portion of the polymerized material was pulverized and boiled with several portions of water to remove any unreacted components, and a proximate analysis for carbon and hydrogen was conducted upon the sample. This analysis showed that the compound contained:

| | Per cent |
|---|---|
| Carbon | 59.65 |
| Hydrogen | 6.53 |
| Oxygen (by difference) | 33.82 |

This analysis indicates that the polymer contains approximately equimolecular portions of maleic anhydride and dimethallyl ether.

The exact nature of the polymerization reaction is unknown, and in view of the insolubility of the resulting polymer, it is unlikely that any proof as to the exact composition of the polymer can be obtained. Furthermore, it is shown that neither of the reacting substances form simple polymers. Thus 96 grams of maleic anhydride was treated with a fraction of a gram of benzoyl peroxide as catalyst and treated in the same manner as the previously described mixture was treated, heating the maleic anhydride with benzoyl peroxide to a temperature of 130° C. There was no indication of any polymerization at any time during the heating, and prolonged heating over a period of several hours at this high temperature did not yield any indication of the formation of any polymers. Similarly, 125 grams of dimethallyl ether were mixed with a fraction of a gram of benzoyl peroxide and heated to a temperature of 130° C., and in this instance also there was no indication of any reaction and no indication of the formation of any polymer even after prolonged heating for several hours at 130° C. Likewise, solutions of both maleic anhydride and of dimethallyl ether were dissolved in dioxane, small quantities of benzoyl peroxide added, and the respective mixtures heated as before to a temperature of approximately 101° C. for a period of several hours. In these instances also no indications of the formation of any polymers were observed.

Example 2

A similar reaction occurs with citraconic anhydride and methallyl ether.

A mixture was prepared consisting of 112 grams (1 gram molecule) of citraconic anhydride and 126 grams (1 gram molecule) of dimethallyl ether. To this mixture there were then added several small crystals of benzoyl peroxide to accelerate the reaction and the mixture, in a container, was placed upon a hot plate and connected to a reflux condenser. The heating was continued for several hours at a temperature of about 90° C. At an early stage a very viscous amber colored liquid formed which later became a thermoplastic resin, solid at room temperature. This resin is thermoplastic, in contrast to the resin of Example 1.

Example 3

A similar polymerization reaction is found to occur with maleic anhydride and diisobutenyl.

In practicing this embodiment of the invention a mixture was prepared consisting of equimolecular portions of maleic anhydride and diisobutenyl (112 grams of maleic anhydride with 112 grams of diisobutenyl). To this mixture there was then added an equal volume of dioxane which is a mutual solvent for the maleic anhydride and diisobutenyl. To this mixture there were then added several crystals of benzoyl peroxide as in Example 2 and the mixture was heated to a temperature ranging from approximately 90° C. to the boiling point of dioxane of 101° C. for a period of several hours. The dioxane was then distilled off leaving a hard, tough, resin closely similar to those of Examples 1 and 2.

Example 4

A similar reaction occurs with the mono-ethyl ester of maleic acid. A mixture of equimolecular portions with the monoethyl ester of maleic acid and diisobutenyl (125 grams of the monoethyl ester of maleic acid and 100 grams of diisobutenyl) was prepared with an equal volume of dioxane as in Example 3. To this mixture there were then added a few crystals of benzoyl peroxide and the mixture was heated to a temperature ranging between 90° C. and the boiling point of dioxane at 101° C. for a period of several hours. At the close of the reaction period the dioxane was removed by distillation leaving the reaction products in the form of a hard, tough, thermoplastic resin.

Example 5

This reaction proceeds equally well with citraconic anhydride having the formula

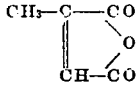

When mixed with methallyl chloride having the formula

A mixture of these substances was prepared in the ratio of 2 mols of methallyl chloride and 1 mol of the anhydride and heated to a temperature of approximately 90° C. under pressure in the presence of small quantities of an organic peroxide, specifically, benzoyl peroxide, the desired polymerization thereupon occurred to produce a hard, tough resin.

This general reaction occurs readily between the general group of unsaturated acid anhydrides and the alpha olefinic compounds containing one or more isobutenyl groups. Representative examples of the alpha olefinic compounds are methallyl chloride, methallyl acetate, dimethallyl ether, diisobutenyl, 2-methyl-heptene-1, isobutylene (under pressure) and many other similar and analogous alpha olefins. Representative members of the acid anhydrides are maleic acid, maleic anhydride or acid esters, citraconic acid, anhydride or ester or half ester, and other homologs of maleic anhydride and maleic acid.

In conducting the reaction it is preferable where possible to dissolve the acid anhydride in the alpha olefin in the appropriate proportions as above pointed out. These proportions may be equimolecular or they may vary widely in proportion. Where the mutual solubility is not adequate a suitable solvent for both the acidic body and the alpha olefin is desirable. A convenient solvent for these substances is dioxane, a cyclic ether.

The resulting resins are particularly advantageous for impregnating fabrics of the various kinds and as a molding composition, especially those which are thermoplastic. For this purpose the polymerized resin and an appropriate filler such as the inert metallic oxides or wood flour or asbestos or other similar filler substances may be mixed together, placed in the mold and heated under pressure to produce the desired article. Or a desired filler may be incorporated into the unpolymerized solution and the composition placed in the mold directly, the solvent being driven off during the molding operation, especially in the case of the infusible resin, or the solvent may be evaporated to leave a dry molding powder in which the particles of filler are coated with resin.

In some instances, especially with the infusible form of the resin, the reactants as such may be dissolved in the solvent, preferably dioxane as above mentioned, incorporated with the desired filler, placed into the mold and the polymerization and molding conducted simultaneously under heat and pressure in the mold.

Alternatively, the polymer may be incorporated into fabric by allowing the fabric to absorb a suitable amount of the solution of acid anhydride in alpha olefin and heating the fabric with the solution to the polymerization temperature. The heating may be conducted in the open, but preferably under pressure, as between plates in a press, and in either event a stiffened fabric is obtained.

The resin shows a phenomenally high resistance to heat, substantially no decomposition, depolymerization or other change occurring at any temperature up to about 250° C. This characteristic of the material is particularly advantageous in connection with inorganic filler substances such as asbestos fiber or asbestos cloth, mica either in the form of splittings, or pulverized, and the various other inorganic or temperature resistant substances such as the metal oxides including ferric oxide, chromic oxide, zinc oxide, carbon black, etc.

The high heat resisting characteristics of the polymeric resin makes it particularly useful under conditions of elevated temperatures, such as in electric insulation. Thus asbestos cloth wound upon electrical conductors, saturated with the polymerizable solution, and then polymerized at the appropriate temperature is particularly advantageous for the windings of high power electrical machinery, especially for field and armature windings of turbo-alternators where the temperature conditions are especially severe. Similarly a preparation containing asbestos fiber, talc, ground mica or other inorganic fillers is particularly advantageous for the making of molded commutators especially for small motor service where the heat conditions are severe and the commutator must be inexpensive.

In comparison with the synthetic resins and copolymeric products hitherto known, the copolymeric synthetic resins obtainable according to the present invention have many industrial advantages, aside from their remarkably high resistance to mechanical strains; and stability to all solvents, even very reactive solvents as well as mixtures of solvents including water. They are useful for many industrial purposes which have to fulfill particularly high requirements, for instance, such as stability to heat up to about 250° C., for containers, ducts, packing materials which come into contact with solvents, especially with fuels (benzene, gasoline and the like).

The products prepared by interpolymerizing maleic anhydride with an alpha olefin ether, insofar as they contain a saponifiable group, may be transformed with the aid of a saponifying agent into new water soluble substances. Instead of using maleic anhydride as one of the co-reactants, compounds of the following formula:

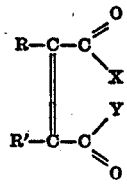

wherein R and R'— are substituents of the class consisting of hydrogen, alkyl and aryl radicals; Y is a substituent of the class consisting of oxyalkyl, oxyaryl, hydroxyl and monatomic oxygen; and X is a substituent of the class consisting of hydroxyl and monatomic oxygen.

Thus, the invention consists of the preparation of a high molecular weight synthetic resin from mixtures of an acid anhydride or a derivative thereof, such as maleic anhydride or ester, etc. with an alpha olefin compound to produce a high molecular weight polymer.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:
1. A synthetic resin comprising interpolymerized dimethallyl ether and a compound of the formula

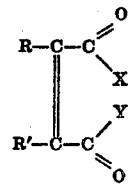

wherein R and R' are selected from the group consisting of hydrogen and alkyl radicals, X is selected from the group consisting of hydroxyl and monatomic oxygen, and Y is selected from the group consisting of oxyalkyl, hydroxyl and monatomic oxygen.

2. A synthetic resin comprising interpolymerized dimethallyl ether and maleic anhydride.

3. A synthetic resin comprising interpolymerized dimethallyl ether and citraconic anhydride.

4. The process of producing a synthetic resin comprising the steps of mixing dimethallyl ether with a compound of the formula

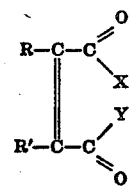

wherein R and R' are selected from the group consisting of hydrogen and alkyl radicals, X is selected from the group consisting of hydroxyl and monatomic oxygen, and Y is selected from the group consisting of oxyalkyl, hydroxyl and monatomic oxygen, adding a peroxide polymerization catalyst and maintaining the mixture at a temperature between 70° C. and 150° C. for time intervals from a few minutes to several hours, thereby forming a solid resin.

5. The process of producing a synthetic resin comprising the steps of mixing together dimethallyl ether and maleic anhydride, adding to the mixture a peroxide polymerization catalyst, heating the material to a temperature within the range between 70° C. and 150° C. for a time interval ranging from a few minutes to several hours to form a solid resin.

6. The process of producing a synthetic resin comprising the steps of mixing together dimethallyl ether and citraconic anhydride, adding to the mixture a peroxide polymerization catalyst, heating the material to a temperature within the range between 70° C. and 150° C. for a time interval ranging from a few minutes to several hours to form a solid resin.

ROBERT M. THOMAS.
WILLIAM J. SPARKS.